United States Patent [19]

Werle et al.

[11] 4,379,871
[45] Apr. 12, 1983

[54] PROCESS FOR THE PRODUCTION OF CARBON BLACK CONTAINING PIGMENT-SYNTHETIC RESIN CONCENTRATES

[75] Inventors: Peter Werle, Arnsberg; Hans Gräf, Rodenbach; Erwin Walter, Hörstein, all of Fed. Rep. of Germany

[73] Assignee: Deutsche Gold- und Silber-Scheideanstalt Vormals Roessler, Frankfurt am Main, Fed. Rep. of Germany

[21] Appl. No.: 865,968

[22] Filed: Dec. 30, 1977

Related U.S. Application Data

[63] Continuation of Ser. No. 641,604, Dec. 17, 1975, abandoned.

[30] Foreign Application Priority Data

Jan. 9, 1975 [DE] Fed. Rep. of Germany ....... 2500664

[51] Int. Cl.$^3$ ............................................. C08J 3/20
[52] U.S. Cl. ................................... 523/331; 106/198; 106/307; 523/333; 523/340; 523/342; 524/495; 524/496
[58] Field of Search .................... 260/42.54; 106/307; 523/333, 331, 340, 342; 524/495, 496

[56] References Cited

U.S. PATENT DOCUMENTS

| 2,379,237 | 6/1945 | Jenkins | 260/42.54 |
| 2,786,822 | 3/1957 | Vesce | 260/42.54 |
| 2,913,432 | 11/1959 | Gulick | 260/42.54 |
| 3,085,988 | 4/1963 | Hull et al. | 260/42.54 |
| 3,215,663 | 11/1965 | Weisberg | 260/42.54 |
| 3,561,003 | 2/1971 | Lonham | 260/42.55 |
| 3,637,571 | 1/1972 | Polovina | 260/42.54 |

OTHER PUBLICATIONS

Perry's Chemical Engineers Handbook, 4th Edition, 1963, McGraw-Hill, pp. 19-76 and 19-77.

Primary Examiner—James H. Derrington
Attorney, Agent, or Firm—Cushman, Darby & Cushman

[57] ABSTRACT

There is disclosed a process for the production of a pigment-synthetic resin concentrate containing an organic solvent soluble polymer and carbon black having quicker distributability in organic media such as lacquer binding media, printing inks, etc., such concentrates being especially suitable for the production of molded parts, castings, films and/or synthetic fibers, the process comprising continuously homogenizing in a mixer powdery pigment and powdery synthetic resin jointly with an organic solvent in a given case also containing plasticizer, stabilizer and/or dispersing acid, dispersing the pigment in the mixture, removing the solvent from the dispersion, comminuting the resulting pigment-synthetic resin concentrated and grinding the product.

40 Claims, No Drawings

PROCESS FOR THE PRODUCTION OF CARBON BLACK CONTAINING PIGMENT-SYNTHETIC RESIN CONCENTRATES

This is a continuation of application Ser. No. 641,604 filed Dec. 17, 1975 now abandoned.

The invention is directed to a process for the production of a pigment-synthetic resin concentrate containing an organic solvent soluble polymer and carbon black having quicker distributability in organic media such as lacquer binding media, printing inks, etc., such concentrates being especially suitable for the production of molded parts, castings, films and/or synthetic fibers.

Such pigment-synthetic resin concentrates are used because of their favorable ratios between pigment content and volumes because thereby, among others there can be saved substantial storage and transportation costs.

It is known to produce carbon black containing pigment-synthetic resin concentrates in the form of so-called chips so that the pigment is mixed into the synthetic resin with the help of crushing rolls, kneaders, extruders or similar heavy dispersing apparatus, the mixture distributed in there to a comminutable mass and subsequently formed into chips. The pigment-synthetic resin concentrates obtained in this manner have the disadvantage that they can contain thermally changed polymers formed under the influence of the high shearing forces in their production. These thermally changed polymers unfavorably influence the industrial properties of the concentrates. Thus the thermal burden in the manufacture of the concentrate frequently leads to a higher degree of polymerization of the polymer through which there observed, for example in the further working up to a lacquer, loss of luster, formation of spots and poor solubility.

The invention is based on the problem of developing a process for the production of a carbon black containing pigment-synthetic resin concentrate which does not require the use of strong dispersing machines and breaking apparatus.

The object of the invention is to develop a process for the production of a pigment-synthetic resin concentrate containing an organic solvent soluble polymer and carbon black having quicker distributability in organic media such as lacquer binding media, printing inks, etc., such concentrates being especially suitable for the production of molded parts, castings, films, fibers, etc., the process comprising continuously homogenizing in a mixer powdery pigment and powdery synthetic resin jointly with an organic solvent, in a given case also containing plasticizer, stabilizer, and/or dispersing aid, dispersing the pigment in the mixture, removing the solvent from the dispersion, comminuting the resulting pigment-synthetic resin concentrate and grinding the product.

As mixers for homogenization of the pigment-synthetic resin mixture in the organic solvent there can be used, among other known apparatus, a swash plate pump, a twin-screw, a Silverson ® Flush-Mix-Mixer, an Exenter screw pump or a Supraton ® mixer, while the dispersion of the process can be carried out in several, for example two, agitator ball mills connected in series.

Additional dispersing apparatus which can be used include, for example colloid mills, disk mills, three-roller mills, ultrasonic dispersers, hopper mills and high pressure homogenizers.

As organic solvents which dissolve synthetic resins there can be employed according to the invention, for example, ketones, carboxylic acid amides, carboxylic acid esters, ethers, alcohols, halohydrocarbons, e.g. haloalkanes, and halophenols. The preferred solvents include acetone, dimethyl formamide, carbon tetrachloride, ethyl acetate, tetrahydrofuran, toluene, chloroform, ethanol and/or o-chlorophenol both individually or in admixture. Other solvents include methyl ethyl ketone, dimethyl acetamide, chloroform, trichloroethylene, isopropyl alcohol, methyl alcohol.

There can be used, for example, a vacuum drum dryer at a working pressure up to 100 Torr, preferably 70 Torr and a drum temperature between 40° and 170° C., preferably 50° to 160° C. to continuously remove the organic solvent. The concentration of solids in the dispersion can be 10 to 50 weight %, preferably 14 to 47 weight %. The amount of solids is determined, for example, by taking 10 grams of the dispersion and drying it to constant weight at a temperature of 10° C. above the boiling point of the solvent.

Another way for removal of solvent from the dispersion according to the process of the invention consists of using a spray dryer in which the mixture is atomized with nitrogen or air wherein the entrance temperature of the nitrogen (or air) can be 100° to 200° C. and the exit temperature of the nitrogen (or air) can be 60° to 100° C. The mixture to be atomized can have a pigment-synthetic resin concentration of 10 to 40 weight %, preferably 15 to 25 weight %.

As pigments there can be used for example carbon blacks of the classes HCC (High Color Channels), RCC (Regular Color Channel), MCC (Medium Color Channel), LFI (Long Flow Impingement), FCF (Fine Color Furnace), FCFm (Fine Color Furnace medium) and/or MCF (Medium Color Furnace) in any desired mixture or as individual materials.

As synthetic resins there can be used, for example, polyvinyl chloride-polyvinyl acetate mixed polymer, vinyl chloride-vinyl acetate copolymer, polyacrylonitrile, polystyrene, nitrocellulose, polyvinyl chloride, polyethylene, polypropylene, poly methyl methacrylate, polyamides, for example a mixed condensate of adipic acid-hexamethylene diamine and ε-caprolactam and or polyesters, e.g. polyethylene glycol terephthalate, polypropylene, vinyl chloride-vinyl acetate copolymer, etc. in any desired mixture or as individual materials, whereby the ratio of synthetic resin/pigment can be 85:15 to 45:55, preferably 82:18 to 49:51. A synthetic resin concentration of 6.0 to 40.0 weight % can be used in the mixture to be dispersed, whereupon in the dispersing a ratio of the sum of synthetic resin/pigment to solvent of 1:1.0 to 1:7.0, preferably 1:1.0 to 1:6.0 based on weight can be used.

As plasticizers which impart softness and flexibility to brittle synthetic resins as to favorably influence the hardness, adhesiveness, pliability, elasticity, tenacity and gloss, which materials are added in order to give these a good hand and make them pliable, there can be used physiologically unobjectionable esters, ketones, acid amides, alcohols, ethers, etc., for example triphenyl phosphate, butyl oleate, dibutyl phthalate, glycerine diacetate, dimethylglycol phthalate, camphor, castor oil, epoxidized soybean oil, toluene sulfonic acid esters, e.g. phenyl p-toluenesulfonate, benzophenone, etc. The plasticizer is not critical and any of the conventional plasticizers can be used.

The plasticizer can be used in a concentration up to 20 weight %, e.g. −0.5 to 20%, preferably 2–5% based on the total weight of the synthetic resin and pigment employed.

Further in the process of the invention there can be used conventional heat and light stabilizers in a concentration up to 2 weight %, e.g. −0.01 to 2 weight %, preferably up to 0.5 weight % based on the total weight of the synthetic resin and pigment employed.

These stabilizers have the task of guarding against a possible decomposition by heat and/or light of the carbon black pigmented synthetic resin concentrate. Among these materials there can be used as ultraviolet absorbers for example phenolic ketones such as 2-hydroxy-2-methoxy-benzophenone, 2,2'-dihydroxy-4-methoxybenzophenone, 2,2'-dihydroxy-4-octoxybenzophenone, 2-hydroxy-4-octoxybenzophenone and as heat stabilizers organotin compounds, for example dibutyltin bis(octyl thioglycolate), dimethyltin bis(octyl thioglycolate) and dibutyltin bis(octyl mercaptopropionate). However, any of the other conventional heat and light stabilizers can be used.

For carrying out the dispersion there can be used wetting agents or dispersing aids in a concentration up to 0.3 weight %, e.g. −0.01 to 0.3, preferably up to 0.2 weight % based on the total weight of the synthetic resin and the pigment. Among these may be mentioned surface active, natural and synthetic cationic anionic, zwitterionic and nonionic material as, for example, alkylaryl sulfonates, e.g. sodium p-dodecylbenzenesulfonate or polyethylene glycol ethers. Any of the conventional wetting and dispersing agents can be used.

A further object of the invention is the novel carbon black containing pigment-synthetic resin concentrates obtained by the process of the invention.

These are characterized by a finely divided, loose, porous and voluminous structure which makes possible a quick penetration of solvents, lacquer binding media, polymers, etc. and produces in surprisingly shorter times an optimal distribution of the pigment in the end product produced.

The invention is further concerned with the use of the carbon black containing pigment synthetic resin concentrates for the pigmentation of synthetic resins, lacquers and/or printing inks or their intermediate products.

Unless otherwise indicated, all parts and percentages are by weight.

The preferred procedures within the invention are illustrated in the following examples.

I PRODUCTION OF CARBON BLACK/SYNTHETIC RESIN CONCENTRATE

Example 1

| | |
|---|---|
| Polyvinyl chloride - polyvinyl acetate Co-polymer, K-value 43; density 1.36 g/cm³ | 774 grams |
| Plasticizer Citroflex A 4 ® | 20 grams |
| Stabilizer Irgastab MOK 17 ® | 5 grams |
| Wetting Agent Monflor 53 ® | 1 gram |
| Carbon black (Reagent) | 200 grams |
| Acetone | 2050 grams |

The mixture of carbon black powder and synthetic resin powder together with the acetone that contained dissolved therein the plasticizer, stabilizer and wetting were charged to a twin screw pump and removed as a homogenized solution. This solution was charged to two successive ball mills provided with different sizes of balls for preliminary and fine dispersion and the finished dispersion withdrawn at the top of the mills.

(a) The dispersion was freed of solvent on a vacuum drum drier at a drum temperature of 70° C. and a pressure of 60 Torr. The resultant carbon black-synthetic resin concentrate has a very low bulk density (apparent weight) was comminuted on a grater and subsequently ground to a powder.

(b) The dispersion was diluted to a solids content of 20% by the addition of acetone and atomized by passing through a binary nozzle operated by nitrogen at 120° C. in a nitrogen heating medium. The carbon black-synthetic resin concentrate accumulated as small, porous balls.

The carbon black "Regent" used belongs to the class HCC (High Color Channel) I and has the following properties:

| | |
|---|---|
| Nigrometer Index | 59 |
| Whiting out mixture | 0.82 |
| Oil demand g/100 g | 1050 |
| Tamped density g/ml | 0.11 |
| pH value | 4 |
| Particel size µ (nm) | 10 |
| BET surface are m²/g | 420 |

The K value used for characterizing the synthetic resin in example 1 and the following example is a defined quantity for the viscosity of synthetic resins by Fikentscher [Cellulosechemine Vol. 13, page 60 (1932)].

Example 2

| | |
|---|---|
| Polyvinyl chloride - polyvinyl acetate Co-polymer, K value 43; density 1.36 g/cm³ | 774 grams |
| Plasticizer Citroflex A 4 ® | 20 grams |
| Stabilizer Irgastab MOK 17 ® | 5 grams |
| Wetting Agent Monflor 53 | 1 gram |
| Carbon black FW 1 | 200 grams |
| Acetone | 2800 grams |

The carbon black used belongs to the class HCC II (High Color Channel) and has the following properties:

| | |
|---|---|
| Nigrometer Index | 64 |
| Whiting out mixture | 0.86 |
| Oil demand g/100 g | 880 |
| Tamped density g/ml | 0.13 |
| pH value | 4 |
| Average particle size µ (nm) | 13 |
| BET surface area m²/g | 320 |

The components were worked up as in example 1.

Example 3

| | |
|---|---|
| Polyvinyl chloride - polyvinyl acetate Co-polymer, K value 43; density 1.36 g/cm³ | 674 grams |
| Plasticizer Citroflex A 4 ® | 20 grams |
| Stabilizer Irgastab MOK 17 ® | 5 grams |
| Wetting Agent Monflor 53 ® | 1 gram |
| Carbon black S 160 | 300 grams |
| Acetone | 2850 grams |

The carbon black S 160 used belongs to the class MCC (Medium Color Channel) and has the following data:

| | |
|---|---|
| Nigrometer Index | 76 |
| Whiting out mixture | 0.98 |
| Oil demand g/100 g | 560 |
| Tamped density g/ml | 0.13 |
| pH value | 5 |
| Average particle size $\mu$ (nm) | 20 |
| BET surface area $m^2/g$ | 150 |

The components were worked up as in example 1.

Example 4

| | |
|---|---|
| Polyvinyl chloride - polyvinyl acetate Copolymer, K value 43; density 1.36 g/cm³ | 574 grams |
| Plasticizer  Citroflex A 4 ® | 20 grams |
| Stabilizer  Irgastab MOK 17 ® | 5 grams |
| Wetting agent  Monflor 53 ® | 1 gram |
| Carbon black SS4 | 400 grams |
| Acetone | 2600 grams |

The carbon black SS4 belongs to the class LFI (Long-Flow Impingement) (o)

| | |
|---|---|
| Nigrometer value | 80 |
| Whiting out mixture | 0.86 |
| Oil demand g/100 g | 300 |
| Tamped density g/ml | 0.19 |
| pH value | 3 |
| Average particle size $\mu$ | 25 |
| BET surface area $m^2/g$ | 180 |

The components were worked up as in example 1.

Example 5

| | |
|---|---|
| Polyvinyl chloride - polyvinyl acetate Copolymer, K value 43; density 1.36 g/cm³ | 574 grams |
| Plasticizer  Citroflex A 4 ® | 20 grams |
| Stabilizer  Irgastab MOK 17 ® | 5 grams |
| Wetting agent  Monflor 53 ® | 1 gram |
| Carbon black  Printex 140 U | 400 grams |
| Acetone | 2500 grams |

The carbon black Printex 140 U belongs to the class RCC (Regular Color Channel) and has the following properties:

| | |
|---|---|
| Nigrometer Index | 84 |
| Whiting out mixture | 0.91 |
| Oil demand g/100 g | 360 |
| Tamped density g/ml | 0.13 |
| pH value | 5 |
| Average particle size $\mu$ (nm) | 29 |
| BET surface area $m^2/g$ | 96 |

The components were worked up in the manner described in example 1.

| | |
|---|---|
| Polyvinyl chloride - polyvinyl acetate Copolymer, K value 43; density 1.36 g/cm³ | 474 grams |
| Plasticizer  Citroflex A 4 ® | 20 grams |
| Stabilizer  Irgastab MOK 17 ® | 5 grams |
| Wetting agent  Monflor 53 ® | 1 gram |
| Carbon black  Printex 400 | 500 grams |
| Acetone | 1400 grams |

The carbon black Printex 400 used belongs to the class FCF$^m$ (Fine Color Furnace modified) and has the following properties:

| | |
|---|---|
| Nigrometer Index | 84 |
| Whiting out mixture | 1.01 |
| Oil demand g/100 g | 330 |
| Tamped density g/ml | 0.30 |
| pH value | 10 |
| Average particle size $\mu$ (nm) | 25 |
| BET surface area $m^2/g$ | 95 |

The components were worked up as in example 1.

Example 7

| | |
|---|---|
| Polyvinyl chloride - polyvinyl acetate Copolymer, K value 43; density 1.36 g/cm³ | 474 grams |
| Plasticizer  Citroflex A 4 ® | 20 grams |
| Stabilizer  Irgastab MOK 17 ® | 5 grams |
| Wetting agent  Monflor 53 ® | 1 gram |
| Carbon black  Printex A | 500 grams |
| Acetone | 1850 grams |

The carbon black Printex A used belongs to the Class MCF (Medium Color Furnace) and has the following properties:

| | |
|---|---|
| Nigrometer Index | 94 |
| Whiting out mixture | 0.73 |
| Oil demand g/100 g | 300 |
| Tamped density g/ml | 0.30 |
| pH value | 8 |
| Average particle size $\mu$ (nm) | 41 |
| BET surface area $m^2/g$ | 46 |

The components were worked up in the manner described in example 1.

Example 8

| | |
|---|---|
| Polyacrylonitrile, K value 85; density 1.8 g/cm³ | 798 grams |
| Wetting agent  Monflor 71 ® | 2 grams |
| Carbon black Regent | 200 grams |
| Dimethyl formamide (DMF) | 5650 grams |

The carbon black belongs to class HCC I. Its properties are described in example 1.

The mixture of polyacrylonitrile powder carbon black powder together with the stated amount of DMF which contained dissolved therein the wetting agent were changed to the screw pump (or Exenter screw pump), withdrawn as a homogenized mixture and led to the agitator ball mills for the purpose of dispersing.

(a) The dispersion was dried on a vacuum drum at 145° C. and 2 Torr. The pigment-synthetic resin concentrate obtained was subsequently ground to a powder.

(b) The dispersion was diluted to 10% with dimethyl formamide and atomized by passing through a binary nozzle. The entrance temperature of the nitrogen serving as heating medium was 200° C.

To increase the bulk density the pigment-synthetic resin concentrate obtained was ground.

Example 9

| | |
|---|---|
| Polystyrene of Melt Index 8-10 g/10 minutes at 200° C. and 5 atmospheres absolute; density 1.04-1.05 | 798 grams |
| Wetting agent   Monflor 53 ® | 2 grams |
| Carbon black Regent | 200 grams |
| Carbon tetrachloride | 5600 grams |

The carbon black belongs to class HCC I. Its properties are described in example 1.

The mixture of polystyrene powder and carbon black powder together with the stated amount of carbon tetrachloride containing the wetting agent were charged to the screw pump (or Exenter screw pump) and then led to the agitator ball mills.

(a) The dispersion was subsequently dried on a vacuum drum drier at a drum temperature of 65° C. and a pressure of 20 Torr.

(b) The dispersion was diluted to 10% solids with carbon tetrachloride and freed of the solvent in a spray drier at a nitrogen entrance temperature of 130° C.

The resulting pigment-synthetic resin concentrate was further ground to a powder.

Example 10

| | |
|---|---|
| Nitrocellulose chips of K value 580 | 818 grams |
| Wetting agent   Sevelite K ® | 2 grams |
| Carbon black Regent | 180 grams |
| Ethyl acetate | 3100 grams |

The carbon black used belongs to the class HCC I. Its properties are described in example 1.

The mixture of nitrocellulose powder and carbon black powder together with the ethyl acetate containing the wetting agent were charged to the screw pump (or Exenter screw pump) and then led to the agitator ball mills. Incompletely dissolved nitrocellulose was immediately brought completely into solution in the lower grinding zones of the mill. The dispersion withdrawn from the top of the last mill was led to the drum drier. The concentrate thus obtained as a sheet at a drum temperature of 50° C. and 25 Torr was ground to chips on a suitable grater.

Example 11

| | |
|---|---|
| Polyvinyl chloride having a K value of 55 | 774 grams |
| Plasticizer   Rheoplast 39 ® | 20 grams |
| Stabilizer   Irgastab MOK 17 ® | 5 grams |
| Wetting agent   Monflor 53 ® | 1 gram |
| Carbon black Regent | 200 grams |
| Tetrahydrofuran | 5600 grams |

The carbon black used belongs to the class HCC I. Its properties are described in example 1.

The mixture of polyvinyl chloride powder and carbon black powder together with the tetrahydrofuran containing the wetting agent were charged to the continuous preliminary mixer (screw pump, Exenter screw pump) and after extensive homogenization, led to the mills to form the dispersion.

(a) The dispersion was worked on the drum drier at a drum temperature of 70° C. and 60 Torr to the solid concentrate. The product accumulating as a sheet was ground to a powder on a suitable mill.

(b) The liquid dispersion was dried on an atomizing drier by means of a binary nozzle at a nitrogen entrance temperature of 130° C.

Example 12

| | |
|---|---|
| Polyethylene of Melt Index 70 g/10 min. according to German Industrial Standard 1238-6.5 T.E.; Density 0.913 g/cm$^3$ | 798 grams |
| Wetting agent   Monflor 53 ® | 2 grams |
| Carbon black Regent | 200 grams |
| Toluene | 2800 grams |

The carbon black used belongs to the class HCC I. Its properties are described in example 1.

The mixture consisting of polyethylene powder and carbon black powder together with the hot toluene at 90°-100° C. and containing the wetting agent were charged to the screw pump or Exenter screw pump heated to about 90° C. The extensively homogenized solution obtained was led to the ball mills heated to 90° C.

(a) The finished dispersion was dried on the roll (drum drier) at 70° C. and 20 Torr.

(b) The hot dispersion was diluted to a solids content of 15% by the addition of hot toluene and atomized at a nitrogen entrance temperature of 140° C.

Example 13

| | |
|---|---|
| Polymethyl methacrylate having a Melt Index of 2-4 g/ID min. at 3.18 kg and 230° C.; density 1.18 g/cm$^3$ | 798 grams |
| Wetting agent   Monflor 71 ® | 2 grams |
| Carbon black Regent | 200 grams |
| Chloroform | 4200 grams |

The carbon black used belongs to the class HCC I. Its properties are described in example 1.

The mixture of polymethyl methacrylate powder and carbon black powder together with the chloroform containing the wetting agent were charged to the screw pump or Exenter screw pump and the resulting solution led to the ball mills for dispersing.

(a) The dispersion was dried on the vacuum drum drier at a drum temperature of 60° C. and 20 Torr. The concentrate accumulating as a sheet can be ground on a suitable mill, for example, a pin disk mill, an impact disk mill, a centrifugal mill or a toothed attrition mill.

(b) For the drying on an atomizing drier the solution was diluted by the addition of chloroform to a solids content of about 15% and the dispersion was atomized with a binary nozzle at an air entrance temperature of 110° C.

Example 14

| | |
|---|---|
| Polyamide resin (Ultramid 1 C) having an acid number of 2-7 mg KOH/g, an amine number of 2-7 mg KOH/g, a melting range of 115-125° C. | 799 grams |
| Wetting agent   Monflor 53 ® | 1 gram |
| Carbon black Regent | 200 grams |
| Ethanol | 1400 grams |

The carbon black used belongs to the class HCC I. Its properties are described in example 1.

The mixture consisting of polyamide powder and carbon black powder together with the alcohol containing the wetting agent were charged to the screw pump or Exenter screw pump and after the homogenization led to the ball mills.

(a) The dispersion was worked on the vacuum drum drier at 60° C. drum temperature and 20 Torr to a solid concentrate which thereby accumulated as a sheet. After grinding it was present as a black powder.

(b) For drying on an atomizing drier the liquid dispersion was diluted to 20% solids content by adding alcohol and atomized with a binary nozzle at a nitrogen entrance temperature of 120° C.

Example 15

| | |
|---|---|
| Polyester polyethylene glycol terephthalate of molecular weight 20,000, melting point 260° C. and relative viscosity = 800 | 798 grams |
| Wetting agent   Monflor 53 ® | 2 grams |
| Carbon black Regent | 200 grams |
| o-Chlorophenol | 6000 grams |

The carbon black used belongs to the class HCC I. Its properties are described in example 1.

The mixture of polyethylene glycol terephthalate ester powder and carbon black powder together with the warm o-chlorophenol (50° C.) containing the wetting agent were charged to the screw pump or Exenter screw pump and then dispersed in the ball mills. The liquid dispersion was dried on the vacuum drum drier at 160° C. and 2 Torr. The concentrate accumulating as a sheet can be ground on a suitable mill. The thus obtained concentrate can be used only for the coloring of polyesters so that the direct addition of carbon black dispersed in ethylene glycol before the polycondensation can be eliminated.

Example 16

| | |
|---|---|
| Polyamide (Ultramid 1 C) having a melting range of 160–170° C. having a density of 1.13 g/cm³ and a specific heat of 0.5 cal/g. °C. | 798 grams |
| Wetting agent   Monflor 53 ® | 2 grams |
| Carbon black Regent | 200 grams |
| Ethanol | 2400 grams |

The carbon black used belongs to the class HCC I. Its properties are described in example 1.

The mixture of finely powdered polyamide and powdered carbon black together with the warm alcohol (40° C.) containing the wetting agent was charged to the screw pump or screw Exenter pump and as an extensively homogenized solution led to the ball mills.

(a) The thus obtained dispersion was worked to a solid concentrate on the vacuum drum drier. The drum temperature conveniently was 60° C. at a pressure of 20 Torr. The product accumulating as a sheet can be ground to a powder on a suitable mill.

(b) The dispersion was diluted to a solids content of about 20% by addition of ethanol in order to dry on an atomizing drier and the solution atomized with a binary nozzle at a nitrogen entrance temperature of 120° C.

II TEST METHODS AND RESULTS OF THE EXAMPLES PERFORMED

1. Examination For Spots

| | | | |
|---|---|---|---|
| 1(a) | Clear lacquer: Hostaflex M 131 | 10 parts | |
| | Ethyl acetate | 20 parts | |
| | Butyl acetate | 20 parts | |
| | Methyl ethyl ketone | 50 parts | |
| 1(b) | Coloring: Clear lacquer 1(a) | 173 parts | |
| | Carbon black - synthetic resin concentrate | 27 parts | |

Stirring time 15 minutes in a laboratory impeller

| | | | |
|---|---|---|---|
| 1(c) | Test: The colored clear lacquer was drawn on a cellophane film with a 50μ doctor blade. After the drying spot formation was evaluated. | | |
| 1(d) | Evaluation | 1 = | very many large spots |
| | | 2 = | many large spots |
| | | 3 = | large spots |
| | | 4 = | few spots |
| | | 4–5 = | sporadic small spots |
| | | 5 = | no spots |

2. Examination of the Sieve Residue

The solution from 1(b) was filtered through a 40μ sieve and the residue after drying weighed and recorded in percent. Products with sieve residues of 0.02 according to experience cause difficulties in working are rejected.

3. Results:

| | Spot Test | Sieve Residue % |
|---|---|---|
| 1. Product according to the state of the art (kneader/roll) | 1–2 | 0.02 to 0.5 |
| 2. Product of the invention (drum dried) | 5 | 0.0 |
| 3. Product of the invention (spray dried) | 4 | 0.015 |

The process can comprise, consist essentially of, or consist of the steps set forth and can comprise, consist essentially of, or consist of the materials set forth.

What is claimed is:

1. In a process for the production of a pigment-synthetic resin concentrate containing an organic solvent soluble polymer and carbon black having rapid distributability in organic solvent media, the improvement consisting essentially of continuously homogenizing in a mixer (1) a carbon black containing pigment powder and (2) an organic solvent soluble synthetic resin with (3) an organic solvent for said synthetic resin as the sole solvent and in an amount sufficient to dissolve the synthetic resin, dispersing the pigment in the mixture, removing the solvent from the dispersion by drying and comminuting the resulting pigment-synthetic resin concentrate.

2. The process of claim 1 wherein there is also included at least one member of the group consisting of plasticizers for the synthetic resin stabilizers for the synthetic resin and dispersing agents.

3. The process of claim 1 wherein there is included a dispersing agent.

4. The process of claim 1 wherein there is included a plasticizer for the synthetic resin.

5. The process of claim 1 wherein there is included a member of the group consisting of heat and light stabilizers for the synthetic resin.

6. The process of claim 1 comprising carrying out the dispersing in a plurality of grinding apparatus in succession.

7. The process of claim 1 wherein the solvent consists essentially of a member of the group consisting of acetone, dimethyl formamide, carbon tetrachloride, ethyl acetate, tetrahydrofuran, toluene, chloroform, ethyl alcohol and o-chlorophenol.

8. The process of claim 1 comprising removing the solvent from the dispersion by means of vacuum drum drying.

9. The process of claim 8 comprising carrying out the vacuum drum drying at a pressure up to 100 Torr.

10. The process of claim 9 wherein the pressure in the vacuum drum drying is up to 70 Torr.

11. The process of claim 9 wherein the solvent is removed from the dispersion at a temperature between 40° and 170° C.

12. The process of claim 11 wherein the solvent is removed from the dispersion at a temperature between 50° and 160° C. and the vacuum drum drying is at up to 70 Torr.

13. The process of claim 8 comprising removing the solvent from a dispersion having a solids content of 10 to 50 weight %.

14. The process of claim 13 wherein the solids content is 14 to 47 weight %.

15. The process of claim 1 comprising removing the solvent from the dispersion by atomizing drying with the aid of an atomizing gas.

16. The process of claim 15 wherein the atomizing gas is nitrogen.

17. The process of claim 15 wherein the atomizing gas has an entrance temperature of 100° to 200° C. and an exit temperature of 60° to 100° C.

18. The process of claim 15 wherein the pigment-synthetic resin concentrate which is atomized has a solids concentration of 10 to 40 weight %.

19. The process of claim 18 wherein the concentration of the atomized pigment-synthetic resin concentrate is 15–25 weight %.

20. The process of claim 1 wherein the carbon black is selected from the group consisting of High Color Channel blacks, Regular Color Channel blacks, Long-F low Impingement blacks, Medium Color Channel blacks, Fine Color-Furnace blacks, Fine Color Furnace modified blacks and Medium Color Furnace blacks.

21. The process of claim 1 wherein the synthetic resin comprises a member selected from the group consisting of polyvinyl chloride-polyvinyl acetate mixed polymer, polyacrylonitrile, polystyrene, nitrocellulose, polyvinyl chloride, polyethylene, polymethyl methacrylate, polyamides and polyesters.

22. The process of claim 1 wherein the ratio of synthetic resin to pigment is from 85:15 to 45:55.

23. The process of claim 22 wherein the ratio of synthetic resin to pigment is from 82:18 to 49:51.

24. The process of claim 22 wherein the synthetic resin is used in a concentration of from 6.0 to 40.0 weight % of the mixture to be dispersed.

25. The process of claim 24 wherein the dispersion the ratio of the sum of the synthetic resin and pigment to the solvent is from 1:1.0 to 1:7.0 by weight.

26. The process of claim 25 wherein said ratio is 1:1.0 to 1:6.0.

27. The process of claim 1 wherein a plasticizer for the synthetic resin is present in an amount as to 20 weight % based on total weight of synthetic resin and pigment is used.

28. The process of claim 27 wherein the plasticizer is 2–5 weight %.

29. The process of claim 1 wherein a stabilizer of the group consisting of heat and light stabilizers for the synthetic resin is present in a concentration up to 2 weight % based on the total weight of synthetic resin and pigment.

30. The process of claim 29 wherein the stabilizer is present in an amount up to 0.5 weight %.

31. The process of claim 1 wherein a dispersing agent is present in an amount up to 0.3 weight % based on the total weight of the synthetic resin and pigment.

32. The process of claim 31 wherein the dispersing agent is present in an amount up to 0.2 weight %.

33. The process of claim 1 wherein the improvement consists essentially of continuously homogenizing in a mixer materials consisting essentially of (1) a carbon black containing pigment powder and (2) an organic solvent soluble synthetic resin with (3) an organic solvent, dispersing the pigment in the mixture, removing the solvent from the dispersion by drying and comminuting the resulting pigment-synthetic resin concentrate.

34. The process of claim 1 wherein the drying is spray drying or vacuum drum drying.

35. The process of claim 34 wherein the drying is spray drying.

36. The process of claim 34 wherein the drying is vacuum drum drying.

37. In a process for the production of a pigment-synthetic resin concentrate containing an organic solvent soluble polymer and carbon black having rapid distributability in organic solvent media, the improvement consisting essentially of continuously homogenizing in a mixer (1) a carbon black containing pigment powder and (2) an organic solvent soluble synthetic resin with (3) an organic solvent, said organic solvent consisting of a solvent for said synthetic resin and being present in an amount sufficient to dissolve the synthetic resin, dispersing the pigment in the mixture, removing the solvent from the dispersion by drying and comminuting the resulting pigment-synthetic resin concentrate.

38. The process of claim 37 wherein the solvent is removed by atomizing drying with the aid of an atomizing gas.

39. The process of claim 37 wherein the drying is spray drying.

40. The process of claim 37 wherein the drying is vacuum drum drying.

* * * * *